Nov. 27, 1962 W. J. SCHOENMAKERS 3,066,282
MAGNETIC MEMORY ELEMENT
Filed Jan. 28, 1960
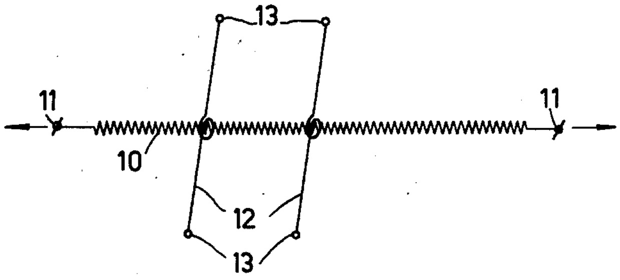
INVENTOR
W. J. SCHOENMAKERS
BY
Frank R. Jifani
AGENT

United States Patent Office 3,066,282
Patented Nov. 27, 1962

3,066,282
MAGNETIC MEMORY ELEMENT

Wijnand Johannes Schoenmakers, Eindhoven, Netherlands, assignor to North American Philips Company, Inc., New York, N.Y., a corporation of Delaware Filed Jan. 28, 1960, Ser. No. 5,151
Claims priority, application Netherlands Feb. 13, 1959
3 Claims. (Cl. 340—174)

This invention relates to magnetic memory elements of the type comprising a wire, twisted about its axis, of electrically-conductive magnetic material having a rectangular hysteresis loop, it being possible in changing the magnetization of the wire for reading out information, to use the wire itself as a reading conductor.

Such an element, which is sometimes referred to as "twistor," has been described, for example, in "The Bell System Technical Journal" of November 1957, pages 1319–1340 and may be used in computers or automatic signalling systems for the storage of information in the form of a given characteristic state of magnetization of the wire. The twisting of the wire gives rise to internal mechanical stresses in the material, that is to say, tensile stress at an angle of 45° to the axis and compressive stress at right angles thereto, resulting in a preferred direction of the magnetization in the material, which extends along helical lines the slope of which is at an angle of 45° to the axis of the wire. Since the magnetization thus has a component at right angles to the axis of the wire, this component may be varied by means of a current through the wire itself, whereas upon change of the magnetization, an induction voltage is produced in the direction of length of the wire. When used as a memory element, information may be registered, for example, by supplying a current either to a winding surrounding the wire or to the wire itself, so that the wire is magnetized in the preferred direction in one sense or the other as a function of the direction of the current. The information may be read out by supplying, for example, a pulse to the winding so that the magnetization changes-over to the opposite direction, whereby an output pulse may be derived from the wire itself. The device is also particularly suited for use in a matrix memory in which the elements are arranged in rows and columns in accordance with a two-dimensional or more-dimensional system of coordinates, elements of the same column or of the same row being coupled to the same control wire or reading wire. The magnetic memory wires may then serve themselves as such coupling conductors whereas the conductors of the other direction of co-ordinates are either coupled magnetically to the memory wires due to their crossing them perpendicularly at a short distance or through the intermediary of coupling windings. A given element is then indicated by supplying simultaneously pulses to the column conductor and the row conductor which are coupled to the element. The strength of these pulses must be such that the magnetic coercive force in memory elements coupled to only one conductor is not exceeded so that the magnetic state of these elements is not influenced, whereas the state of magnetization of the element which is coupled to the two conductors and which thus receives a pulse of double strength is varied.

Such an element thus has to satisfy the requirement that the magnetization must not vary when a current is supplied of a strength which lies below a given first threshold value, whereas the magnetization wholly passes to the opposite direction for a current the strength of which lies above a given second threshold value, and that the said two threshold values are as close to each other as possible. The latter condition is particularly important for obtaining a high speed of changing the magnetization, since this speed is higher as the over-excitation is greater, that is to say, as the field strength is greater as compared to the coercive force.

It has been found in practice that memory elements of the above-mentioned kind individually quite satisfy the said requirement, but that different memory elements, even if made from the same magnetic wire, show comparatively great divergencies with regard to the threshold values. This is a serious drawback for use in a memory matrix, since the control pulses must then be chosen in accordance with the lowest threshold value to be expected so that for elements having a high threshold value the over-energization is comparatively low and hence the speed of changing the magnetization is comparatively low.

A possible explanation of the divergencies found might be that, in order to maintain the torsion, the ends of the wire must be secured rigidly, whereby it is very difficult to prevent a variation in length from occurring in addition to torsion of the wire. Additional mechanical tensions are thus produced in the wire which are superimposed on the tensions brought about due to torsion, which results in the magnetic properties such, for example, as the preferred direction of the magnetization being varied. Even for a relative variation in length of $10^{-8}$, which is extremely small, additional stress would be introduced which is of the same order of magnitude as the torsional stress. This tensile stress may differ for each individual element and is furthermore greatly dependent upon temperature.

The present invention mitigates this disadvantage. According to the invention, the magnetic wire of electrically-conductive magnetic material having a rectangular hysteresis loop is helically wound and subjected to a mechanical force in the direction of the axis of the helix.

In order that the invention may be readily carried into effect, it will now be described in greater detail with reference to the drawing.

The drawing illustrates a memory device according to the invention.

Referring now to the drawing, therein is shown a helix of a wire 10 of electrically conductive magnetic material. The material of the wire has a rectangular hysteresis loop. The ends of the wire are connected to suitable electrical terminals 11, and the wire is subjected to a mechanical force in the direction of the axis of the helix as shown by the arrows in the drawing.

One or more electrical conductors 12 are coupled to the wire 10, the conductors 12 being connected to suitable terminals 13.

Such an element may be manufactured, for example, by winding the wire helically on a mandril and subsequently annealing it so that the mechanical stress disappears, whilst after removal of the mandril, which may be effected, for example, by chemical agency, the helix is stretched up to double its length. As as well-known, upon stretching the helix, the wire is twisted as is the case with a torsion spring. This results, similarly as in known memory elements, in a preferred direction of magnetization, which makes a certain angle with the axis of the wire. The memory element according to the invention may otherwise be used in the same manner as the known "twistor," in which event the wire itself may serve as a reading wire, whereas for varying the magnetization use may be made, for example, of coils with their axes coinciding with the axis of the helix. In a given embodiment use was made of a wire of 20 microns in diameter, consisting of an alloy of 79% of Ni, 4% of Mo, 0.5% of Mn and 16.5% of Fe, the wire being wound on a mandril of 100 microns in diameter with a spacing of 7 microns between the turns whilst after annealing and removal of the mandril, the helix was stretched to double its length.

The change-over time of the magnetization was 0.4 msec., the over-energization being approximately equal to twice the lower threshold value.

It has been found that memory elements thus manufactured show much smaller divergencies in magnetic properties than do known memory elements made of the straight wire, which is presumably attributable to the fact that the internal stress in the material is better defined due to only one variable being present, that is to say, the length of the helix. Another particular advantage is that the electric output voltage for the same total length of the element is much greater than with the known device, since due to the helical winding the effective length of the wire is much greater. For a certain length of the helix, an output voltage of 100 millivolts was obtained, as measured between the ends of the wire, whereas the output voltage of a straight wire having a length equal to that of the helix was only 5 millivolts.

What is claimed is:

1. A magnetic memory element comprising a helix of a wire of electrically conductive magnetic material having a rectangular hysteresis loop, means subjecting said wire to a mechanical force in the direction of the axis of said helix, and electrical conductor means coupled to said wire.

2. A magnetic memory element comprising a helix of a wire of electrically conductive magnetic material having a rectangular hysteresis loop, means subjecting said wire to a mechanical force in the direction of the axis of said helix and in a direction to axially expand said helix, and electrical conductor means coupled to said wire.

3. A magnetic memory element comprising first and second electrical conductors magnetically coupled together, said first conductor comprising a helix of a magnetic material having a rectangular hysteresis loop, and means subjecting said first conductor to a mechanical force in the direction of the axis of said helix whereby said helix is axially expanded.

References Cited in the file of this patent

FOREIGN PATENTS 205,776 Austria ---------------- Oct. 10, 1959